United States Patent
Harden et al.

(10) Patent No.: US 10,351,242 B2
(45) Date of Patent: Jul. 16, 2019

(54) SYSTEM FOR MOVING LOADS

(71) Applicant: Airbus Operations GmbH, Hamburg (DE)

(72) Inventors: Felix Harden, Hamburg (DE); Anton Arosenko, Hamburg (DE); Mathias Haake, Hamburg (DE); Tilman Schomer, Hamburg (DE); Christian Huth, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 5 days.

(21) Appl. No.: 14/748,467

(22) Filed: Jun. 24, 2015

(65) Prior Publication Data
US 2015/0367941 A1 Dec. 24, 2015

(30) Foreign Application Priority Data
Jun. 24, 2014 (DE) .......................... 10 2014 212 057

(51) Int. Cl.
*B64D 9/00* (2006.01)
*B64C 1/20* (2006.01)

(52) U.S. Cl.
CPC ................ *B64D 9/003* (2013.01); *B64C 1/20* (2013.01); *B64D 9/00* (2013.01); *B64D 2009/006* (2013.01)

(58) Field of Classification Search
CPC .... B64D 9/003; B64D 9/00; B64D 2009/006; B64C 1/20; B65G 67/02; B65D 2519/00815; B63B 25/22; B60P 1/4492; B60P 1/52

USPC ........................................................ 414/395
See application file for complete search history.

(56) References Cited

U.S. PATENT DOCUMENTS

| | | | | |
|---|---|---|---|---|
| 2,828,027 A * | 3/1958 | Stevenson | ............. | B60P 1/6427 |
| | | | | 193/35 SS |
| 3,130,829 A * | 4/1964 | Long | ...................... | B65G 13/12 |
| | | | | 104/135 |
| 3,437,219 A * | 4/1969 | Stevenson | ................. | B60P 1/36 |
| | | | | 193/35 R |
| 3,756,544 A * | 9/1973 | Bader | ...................... | B64D 9/00 |
| | | | | 244/137.1 |
| 4,544,319 A * | 10/1985 | Folling | ..................... | B64C 1/22 |
| | | | | 198/457.03 |

(Continued)

*Primary Examiner* — Medhat Badawi
*Assistant Examiner* — Vicente Rodriguez
(74) *Attorney, Agent, or Firm* — Greer, Burns & Crain, Ltd.

(57) ABSTRACT

A system for moving loads comprising a cargo hold floor with a plurality of guide rails, and a plurality of transport vehicles removably received in the guide rails and being movable along the guide rails and which each comprise a carrier face movable perpendicularly to a surface of the cargo hold floor, between a first and a second operating position. The carrier face is arranged, in its first operating position, such that the transport vehicle received in a guide rail is positionable under a load which is deposited, at least partly, on the surface of the cargo hold floor. In its second operating position, the carrier face is arranged such that it lifts the load off the surface of the cargo hold floor and carries it. In the region of the carrier face, there are provided a plurality of rollers adapted to permit movement of the load parallel to the surface of the cargo hold floor.

13 Claims, 6 Drawing Sheets

(56) References Cited

U.S. PATENT DOCUMENTS

| | | | | |
|---|---|---|---|---|
| 4,684,311 A | * | 8/1987 | Dickson-Wright | B65G 67/20 198/774.2 |
| 5,374,151 A | * | 12/1994 | Matthews | B65G 67/20 414/343 |
| 6,817,578 B1 | * | 11/2004 | Garcia | B65D 19/0002 244/118.1 |
| 9,738,372 B2 | * | 8/2017 | Barmichev | B64C 1/20 |
| 2004/0265085 A1 | * | 12/2004 | Mayer | B60P 7/13 410/77 |
| 2006/0243861 A1 | * | 11/2006 | Krueger | B64D 9/00 244/137.1 |
| 2009/0304482 A1 | * | 12/2009 | Sanford | B64D 9/00 414/495 |

\* cited by examiner

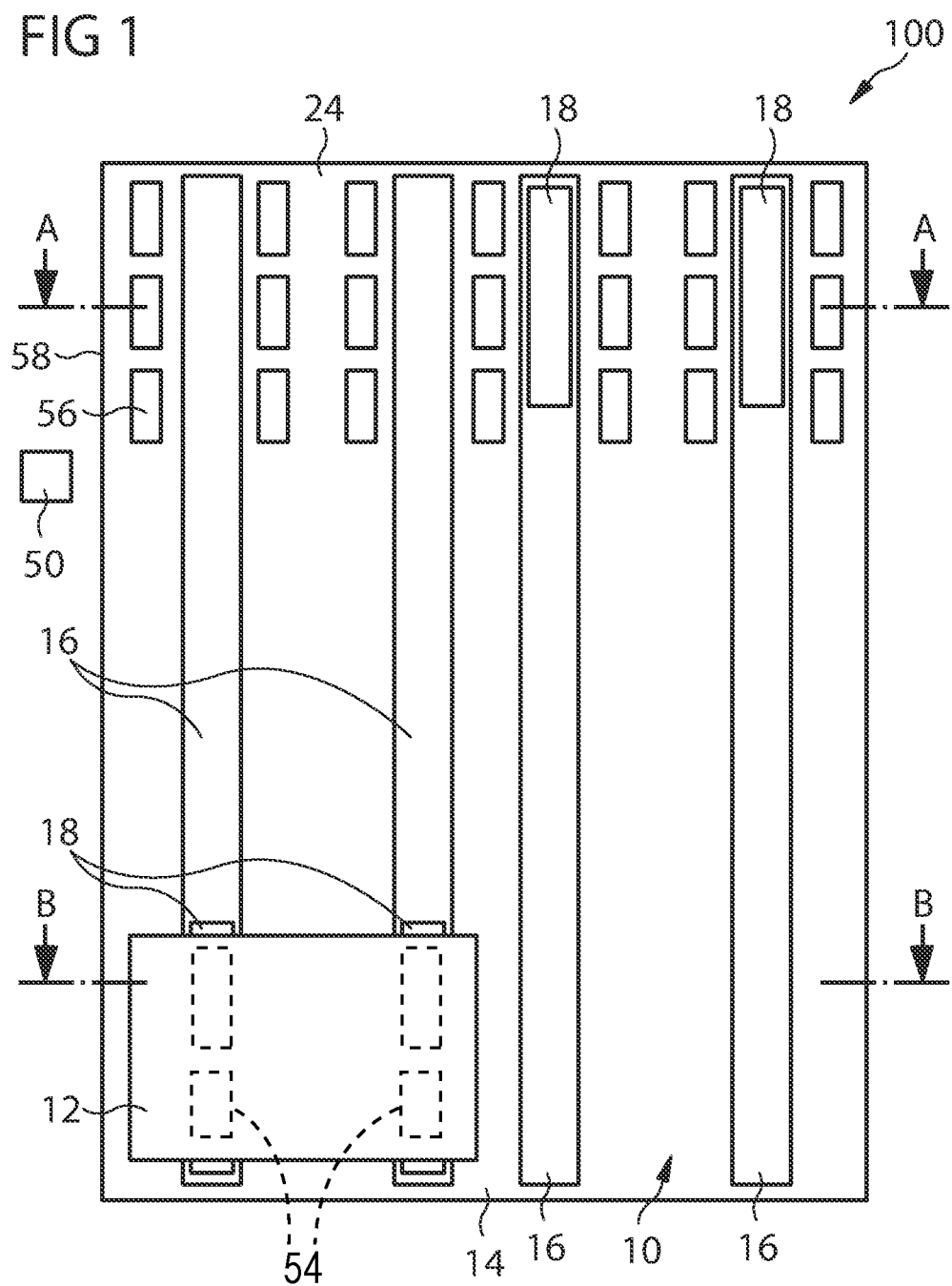

A-A

B-B

SYSTEM FOR MOVING LOADS

CROSS-REFERENCES TO RELATED APPLICATIONS

This application claims the benefit of the German patent application No. 10 2014 212 057.8 filed on Jun. 24, 2014, the entire disclosures of which are incorporated herein by way of reference.

BACKGROUND OF THE INVENTION

The invention relates to a system for moving loads which is suitable, in particular, for use in a cargo hold of an aircraft. The invention also relates to a cargo hold which is equipped with a system of this kind.

Loads which are to be transported in cargo or passenger aircraft are usually deposited in standardized containers or on standardized pallets, so-called "unit load devices" (ULD's). In order to be able to move the ULD's about within the cargo hold of the aircraft, roller tracks which, depending upon their configuration, make it possible to move the ULD's in a direction-dependent or non-direction-dependent manner, are usually integrated into a floor of the cargo hold. A cargo hold equipped with roller tracks of this kind is described, for example, in EP 1 527 993 B1. The ULD's can be moved about manually on the roller tracks. As an alternative to this, an electric drive system with power drive units (PDU's), which system makes it possible to move the ULD's about automatically within the cargo hold, may be provided in or alongside the roller tracks.

SUMMARY OF THE INVENTION

An underlying object of the invention is to make available a system for moving loads which is suitable, in particular, for use in a cargo hold of an aircraft and which makes it possible, when the cargo hold is being loaded or unloaded, to move ULD's about within said cargo hold in a convenient manner and at the same time allows an increase in the useful load of said cargo hold. The underlying object of the invention is also to indicate a cargo hold which is equipped with a system of this kind and which has an increased useful load, compared to a cargo hold equipped with conventional roller tracks.

A system for moving loads which is suitable, in particular, for use in a cargo hold of a means of transport, such as an aircraft, for example, but which can also be used in a stationary storage space, such as a storage building, for example, comprises a cargo hold floor. Said cargo hold floor may comprise any suitable material, for example, a metal or a plastic material. All that is essential is that the cargo hold floor has a mechanical load-bearing capacity which is adapted to the weight and shape of the loads which are intended to be transported in a cargo hold equipped with said cargo hold floor. The loads in question may be standardized containers or standardized pallets, that is to say ULD's, but may also be any other loads. A plurality of guide rails are constructed in the cargo hold floor. Said guide rails may, for example, extend parallel to one another. If the system for moving loads is used in an aircraft, the guide rails may, for example, extend parallel to the direction of flight of the aircraft which is equipped with said system for moving loads.

The system for moving loads also comprises a plurality of transport vehicles which are received in the guide rails in a removable manner and are movable along said guide rails. The transport vehicles can thus be inserted in the guide rails for the purpose of loading or unloading a cargo hold equipped with the system for moving loads, and be taken out of said guide rails again after being used. The transport vehicles may comprise, in the region of their underside, a plurality of rollers for moving them along the guide rail and may be movable manually along the guide rails. As an alternative to this, however, it is also conceivably possible for the transport vehicles to be equipped with a suitable drive mechanism which allows automatic movement of the transport vehicles along the guide rails.

Each transport vehicle comprises a carrier face which is movable, perpendicularly to a surface of the cargo hold floor, between a first operating position and a second position. If the surface of the cargo hold floor is oriented horizontally, the carrier face of each transport vehicle can thus be moved in the vertical direction between its first operating position and its second operating position. In its first operating position, the carrier face is arranged in such a way that the transport vehicle which is received in a guide rail is positionable under a load which is deposited, at least partly, on the surface of the cargo hold floor. In other words, when the carrier face is located in its first operating position, said carrier face of the transport vehicle does not protrude from the guide rail but, on the contrary, is arranged in such a way that it is located below the surface of the cargo hold floor surrounding said guide rail. As a result, the transport vehicle which is received in a guide rail can be positioned under a load which is deposited, at least partly, on the surface of the cargo hold floor.

In its second operating position, on the other hand, the carrier face is arranged in such a way that it lifts the load off the surface of the cargo hold floor and carries it. In its second operating position, the carrier face of the transport vehicle consequently protrudes from the guide rail and is thus shifted into the position for interacting with an underside of a load which is deposited on the surface of the cargo hold floor, and for thus lifting said load off said surface of the cargo hold floor. This makes it possible for the load to be guided with the transport vehicle when the latter moves along the guide rail, and to thus be likewise moved along said guide rail. In its second operating position, the carrier face of the transport vehicle preferably protrudes from the guide rail sufficiently far to enable a load which is deposited on said carrier face to be moved parallel to the surface of the cargo hold floor without friction. For example, in its second operating position, the carrier face of the transport vehicle may be positioned, relative to the surface of the cargo hold floor, in such a way that an underside of a load which is deposited on said carrier face is at a distance of about 20 mm from said surface of the cargo hold floor.

In the region of the carrier face there are provided a plurality of rollers which are adapted or configured to permit movement of the load parallel to the surface of the cargo hold floor. When the carrier face of the transport vehicle is located in its first operating position, the rollers arranged in the region of said carrier face make it possible, in an almost frictionless manner, to bring the transport vehicle which is received in a guide rail into a position under a load which is still resting on the surface of the cargo hold floor. When the carrier face of the transport vehicle is located in its second operating position, on the other hand, the load which is then deposited on the carrier face can be moved, relative to the cargo hold floor, over the rollers in a manner parallel to the surface of the cargo hold floor. It is thus possible, by means of the system for moving loads, to transport a load to almost any desired position within a cargo hold equipped with said system for moving loads.

The transport vehicles of the system for moving loads allow convenient positioning of loads within a cargo hold equipped with the system, so that rapid loading or unloading of said cargo hold is made possible. Furthermore, a cargo hold equipped with the system for moving loads no longer has to be equipped with roller tracks which are integrated into the floor of the cargo hold over a large area. On the contrary, for the purpose of loading or unloading the cargo hold, the transport vehicles may merely be inserted in the guide rails of the cargo hold floor and used for transporting the loads to the desired position within said cargo hold. After they have been used during the loading and unloading operation, said transport vehicles can be taken out of the guide rails and removed from the cargo hold. As a result, the unladen weight of the cargo hold can be reduced, which makes it possible, in advantageous manner, to increase its useful load.

The guide rails may be arranged at a distance from one another which is adapted to the dimensions of the loads to be transported. For example, the distance between mutually adjacent guide rails may be so dimensioned that a load can be deposited on the carrier faces of two or three transport vehicles which are received in two or three mutually adjacent guide rails. As a result, the weight of the load can be distributed over a number of transport vehicles, so that the strength and thereby the weight of the transport vehicles does not need to be too high, and said transport vehicles can remain easy to handle.

The carrier face of the transport vehicles may also be movable, perpendicularly to the surface of the cargo hold floor, into a third position which lies between the first operating position and the second operating position. The movement of the carrier face of the transport vehicles may take place step-wise or continuously. When the carrier face is located in its third operating position, said carrier face of the transport vehicle is preferably arranged in one plane with the surface of the cargo hold floor surrounding the guide rail. If, as will be explained again in greater detail below, a plurality of roller tracks are integrated into a partial region of the cargo hold floor, the rollers provided in the region of the carrier face of the transport vehicles lie in the third operating position of said carrier face, preferably in one plane with the rollers of the roller tracks which are integrated into the partial region of the cargo hold floor. A load can then be brought into a position above the transport vehicle received in a guide rail, and then be deposited, partly on the surface of the cargo hold floor or the rollers of the roller tracks which are integrated into the partial region of said cargo hold floor, and partly on the carrier face of a transport vehicle or the rollers which are provided in the region of said carrier face of the transport vehicle.

The rollers which are provided in the region of the carrier face of the transport vehicles may be adapted or configured to permit movement of the load in all directions parallel to the surface of the cargo hold floor. For this purpose, the rollers may be, for example, of spherical construction. Usually, however, it is sufficient to permit movement of a load perpendicularly to the guide rails in order to bring said load into a desired position within a cargo hold equipped with the system for moving loads. The rollers provided in the region of the carrier face may then be constructed in the form of circular-cylindrical rollers, whose axis of rotation extends parallel to the guide rail. The rollers are then distinguished by a high carrying capacity and high strength, and are therefore then capable of carrying even heavy loads.

In one preferred embodiment of the system for moving loads, each transport vehicle comprises at least one stop element. Said stop element may extend, at least in one transporting operating position, from the carrier face towards a load carried by said carrier face of the transport vehicle, and may be adapted or configured to interact with a side wall of the load when said load is moved along the guide rail by means of the transport vehicle. The stop element may be designed, for example, in the form of a pin which, in its transporting operating position, extends upwards from the carrier face of the transport vehicle. The interaction of the stop element with a side wall of a load which is carried by the carrier face of the transport vehicle ensures that said load is entrained in the desired manner when said transport vehicle is moved along the guide rail.

If desired, each transport vehicle may comprise two stop elements which are arranged at a distance from one another which is adapted or configured to the dimensions of the load which is to be transported on the carrier face of said transport vehicle. The stop elements may then interact with two mutually opposite side walls of the load and thus ensure that said load is always entrained in the desired manner, even if the transport vehicle is moved along the guide rail in opposite directions, for example when loading and unloading a cargo hold equipped with the system for moving loads.

The stop element may be movable, relative to the carrier face of the transport vehicle, between its transporting operating position, in which said stop element extends from the carrier face towards a load carried by said carrier face of the transport vehicle, and an inoperative position, in which said stop element is retracted into said transport vehicle. In its inoperative position, the stop element consequently no longer protrudes upwards from the carrier face of the transport vehicle. What is made possible by this is that, after the lowering of the carrier face out of its second operating position and into its first operating position, and the lowering, which is associated therewith, of a load carried by said carrier face onto the surface of the cargo hold floor, the transport vehicle can be moved along the guide rail, relative to the load, that is to say out from under said load.

The system for moving loads may be equipped with a drive mechanism for moving the stop element between its transporting operating position and its inoperative position. This then also makes possible a movement of the stop element between its transporting operating position and its inoperative position, when the transport vehicle is located in a position, for example under a load, in which said stop element is not accessible for manual actuation. The drive mechanism may comprise an electric motor which is supplied with power by a suitable battery.

If the transport vehicle is provided with two stop elements, both stop elements may be movable relative to the carrier face of the transport vehicle, optionally by means of a drive mechanism, between a transporting operating position and an inoperative position. As an alternative to this, however, it is also conceivably possible to design one stop element as a fixed stop element and one stop element as a movable stop element.

The transport vehicle preferably comprises a base section and a carrier section. Said carrier section preferably comprises the carrier face and a region of the transport vehicle bordering on said carrier face, and may be movable, relative to the base section, perpendicularly to the surface of the cargo hold floor. That region of the transport vehicle which is associated with the carrier section and borders on the carrier face is preferably so dimensioned that it is capable of carrying the loads which are to be transported by means of the transport vehicle.

In one preferred embodiment of the system for moving loads, each transport vehicle is provided, in the region of at least one side face, with a plurality of lateral rollers. Said lateral rollers may be adapted or configured to interact, when the transport vehicle is moved along the guide rail, with a side face of the guide rail that lies opposite the side face of the transport vehicle. By means of the lateral rollers, it is possible to effectively prevent jamming and/or tilting of the transport vehicle within the guide rail.

A lifting mechanism for moving the carrier face of the transport vehicle between its first operating position and its second operating position may comprise at least one of a motor, a transmission, a Cardan joint and a scissor lift table. An arrangement of this kind offers sufficient strength to lift even heavy loads off the cargo hold floor and carry them. It is also possible, with an arrangement of this kind, to carry out the desired lifting of the carrier face in a short period of, for example, two seconds. The motor may be designed in the form of an electric motor which is supplied with power by a suitable battery. As an alternative to this, however, use may also be made of other lifting mechanisms, such as a hydraulic lifting mechanism or a wedge-type lifting mechanism for example, for moving the carrier face of the transport vehicle between its first operating position and its second operating position.

Each transport vehicle may also comprise a control unit which is adapted or configured to control the movement of the carrier face of the transport vehicle between its first operating position and its second operating position. In addition or as an alternative to this, the control unit may be adapted or configured to control the movement of the stop element between its transporting operating position and its inoperative position.

In one preferred embodiment, the system for moving loads comprises a remote control device which is adapted or configured to send control signals to a receiving apparatus belonging to the control unit of the transport vehicles. The operation of said transport vehicles can be controlled in a particularly simple and convenient manner with the aid of the remote control device. Said remote control device may be adapted or configured to transmit infrared signals. The receiving apparatus is then preferably designed in a corresponding manner as an infrared receiving apparatus.

There may be integrated into a partial region of the cargo hold floor a plurality of roller tracks which make it possible to move a load about in a direction parallel to the surface of the cargo hold floor. Said roller tracks may each comprise a plurality of rollers which may have any desired shape, such as a cylindrical shape or a spherical shape for example, but are each mounted so as to be rotatable in such a way that a load which is deposited on the rollers of the roller tracks can be moved about in a direction parallel to the surface of the cargo hold floor. The rollers of the roller tracks are preferably so dimensioned that a load which is deposited on said rollers of the roller tracks is at a sufficient distance from the surface of the cargo hold floor to enable said load to be moved about parallel to said surface of the cargo hold floor without friction.

The integration of roller tracks into a partial region of the cargo hold floor makes it possible to ensure that a cargo hold equipped with the system for moving loads can be completely loaded, even if the transport vehicles have to be taken out of the guide rails towards the end of the loading operation before the guide rails are covered by loads, or else it is not yet possible to position said transport vehicles in the guide rails at the start of the unloading operation because said guide rails are still covered by loads. That partial region of the cargo hold floor which is equipped with roller tracks may be, for example, a region of said cargo hold floor which is arranged adjacent to a door of the cargo hold, if said cargo hold floor is integrated into a cargo hold. If only a partial region of the cargo hold floor is provided with integrated roller tracks, the unladen weight of the system for moving loads is not excessively increased, so that a cargo hold equipped with the system for moving loads still has a higher useful load than a conventional cargo hold whose floor is provided with integrated roller tracks over a large area.

A cargo hold is equipped with an above-described system for moving loads.

In one preferred embodiment of the cargo hold, the partial region of the cargo hold floor into which a plurality of roller tracks are integrated is arranged adjacent to a door of said cargo hold in order, as has been explained above, to permit complete loading of the cargo hold.

At least one of an above-described system for moving loads and/or an above-described cargo hold can be used particularly advantageously in an aircraft.

BRIEF DESCRIPTION OF THE DRAWINGS

Preferred embodiments of the invention will now be explained in greater detail with the aid of the appended schematic drawings, in which:

FIG. 1 shows a schematic top view of a cargo hold equipped with a system for moving loads;

DETAILED DESCRIPTION OF THE PREFERRED EMBODIMENTS

Figure 2A:
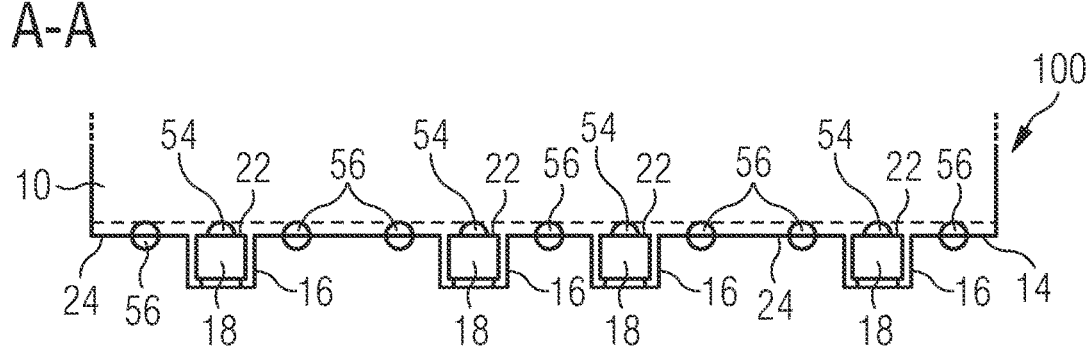
FIG. 2a shows a schematic sectional view of the cargo hold according to FIG. 1, along the line A-A in FIG. 1.
Figure 2B:
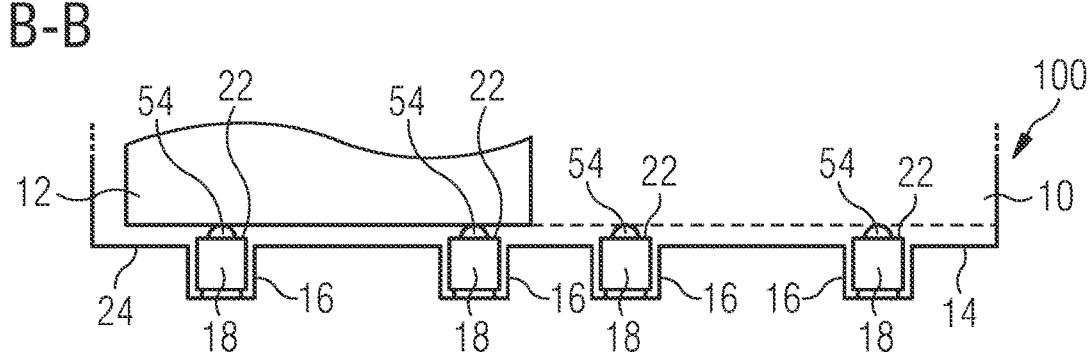
FIG. 2b shows a schematic sectional view of the cargo hold according to FIG. 1, along the line B-B in FIG. 1.

FIGS. 1, 2a and 2b each show a cargo hold 100 which is equipped with a system 10 for moving loads 12. The cargo hold 100 in question is a cargo hold of a means of transport, in particular an aircraft. The system 10 for moving loads comprises a cargo hold floor 14 which has a mechanical load-bearing capacity which is adapted or configured to the weight and shape of the loads 12 which are intended to be transported in the cargo hold 100. The loads 12 in question may be standardized containers or standardized pallets, that is to say ULD's, but may also be any other loads 12. Constructed in the cargo hold floor 14 are a plurality of guide rails 16 which extend parallel to one another and parallel to the direction of flight of an aircraft which is equipped with the cargo hold 100.

Figure 6:
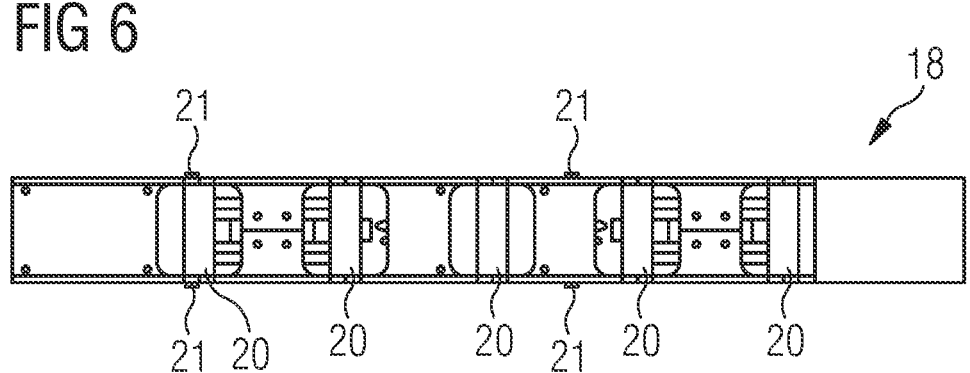
FIG. 6 shows a bottom view of the transport vehicle according to FIG. 4.

The system 10 for moving loads 12 also comprises a plurality of transport vehicles 18 which are received in the guide rails 16 in a removable manner and can be moved along said guide rails 16. The transport vehicles 18 are inserted in the guide rails 16 for the purpose of loading or unloading the cargo hold 100. After being used during the loading or unloading operation, on the other hand, the transport vehicles 18 are taken out of the guide rails 16 again. As can be seen most clearly in FIG. 6, the transport vehicles 18 have, in the region of their underside, a plurality of rollers 20 for moving said transport vehicles 18 along the guide rails 16. The transport vehicles 18 are also provided, in the region of two mutually opposite side faces, with a plurality of lateral rollers 21. Said lateral rollers 21 interact, when the transport vehicle 18 is moved along the guide rail 16, with a side face of said guide rail 16 that lies opposite the respective side face of said transport vehicle, as a result of which jamming and/or tilting of the transport vehicle 18 within the guide rail 16 is prevented.

Figure 3A:
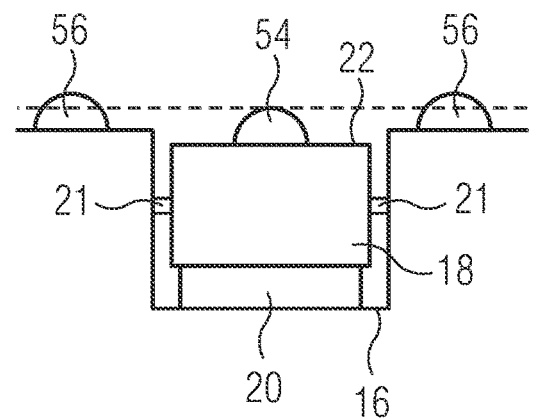
FIG. 3a shows a detail view of the cargo hold according to FIG. 1, wherein a carrier face of a transport vehicle belonging to the system for moving loads is located in a first operating position.
Figure 3B:
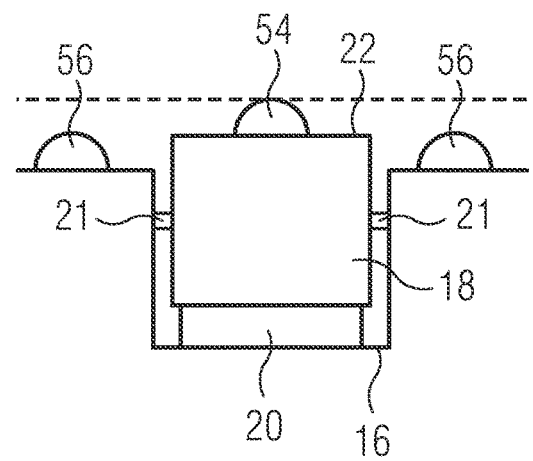
FIG. 3b shows a detail view of the cargo hold according to FIG. 1, wherein a carrier face of a transport vehicle belonging to the system for moving loads is located in a second operating position.
Figure 3C:
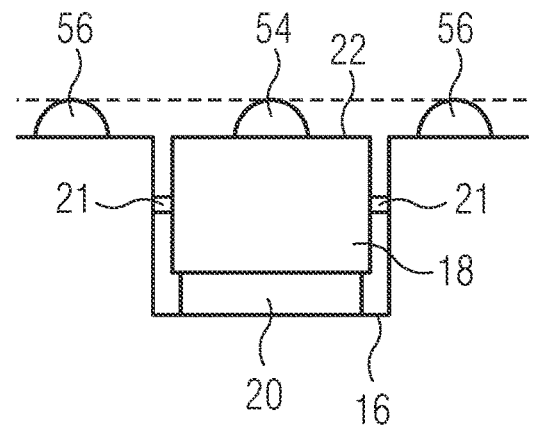
FIG. 3c shows a detail view of the cargo hold according to FIG. 1, wherein a carrier face of a transport vehicle belonging to the system for moving loads is located in a third operating position.
Figure 4:
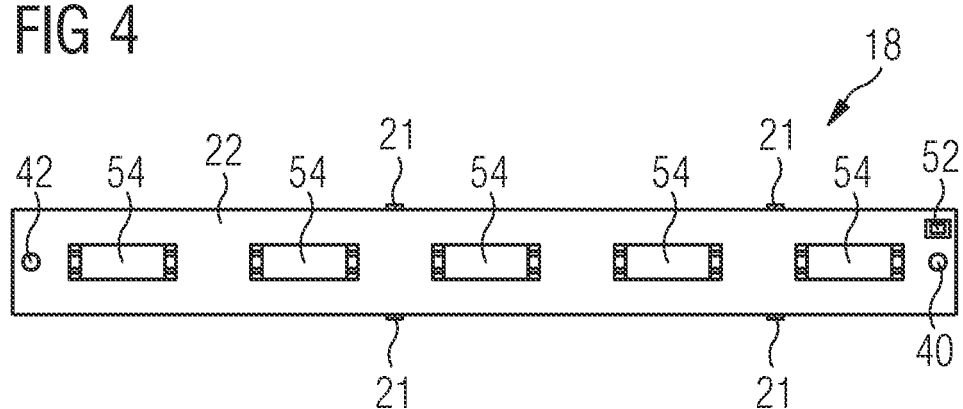
FIG. 4 shows a top view of a transport vehicle which is suitable for use in a system for moving loads according to FIG. 1.
Figure 7:
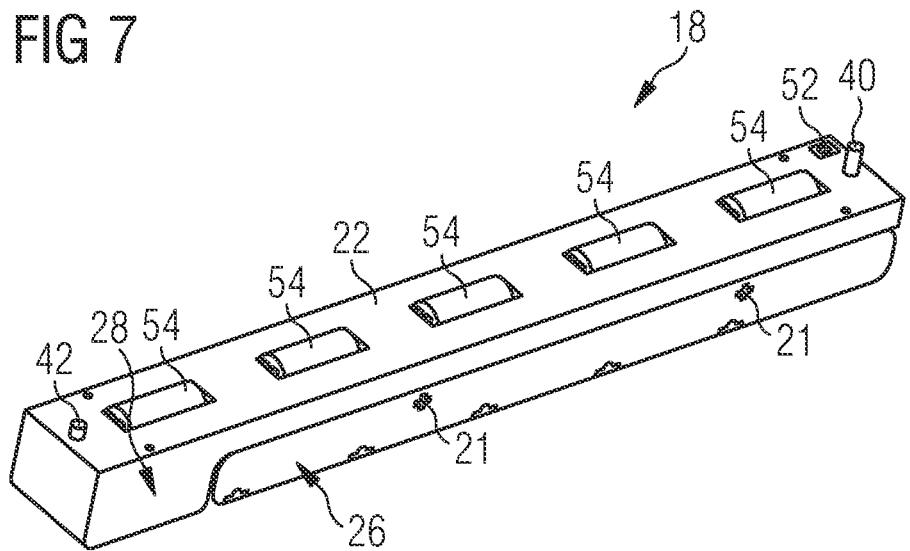
FIG. 7 shows a three-dimensional view of the transport vehicle according to FIG. 4, wherein a carrier face of said transport vehicle is located in a first operating position.
Figure 8:
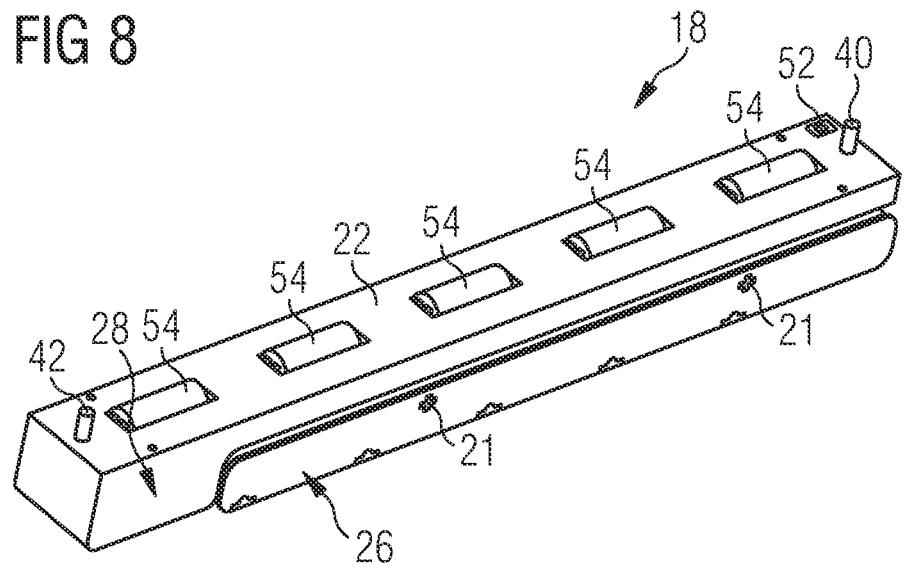
FIG. 8 shows a three-dimensional view of the transport vehicle according to FIG. 4, wherein the carrier face of said transport vehicle is located in a second operating position.
Figure 9:
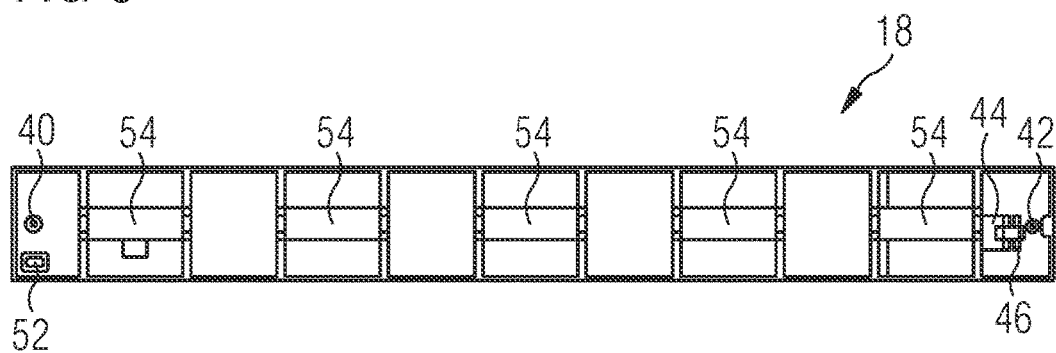
FIG. 9 shows a partly cut-away top view of the transport vehicle according to FIG. 4.

Each transport vehicle 18 also comprises a carrier face 22 which can be moved, perpendicularly to a surface 24 of the cargo hold floor 14, between a first operating position and a second position. The representations according to FIGS. 3a and 7 show a transport vehicle 18 whose carrier face 22 is located in its first operating position. FIGS. 2b, 3b and 8, on the other hand, show transport vehicles 18 whose carrier face 22 is located in its second operating position. Finally, the carrier face 22 of the transport vehicles 18 can be moved, as shown in FIGS. 2a and 3c, into a third operating position which lies between the first operating position and the second operating position.

In its first operating position, the carrier face 22 of each transport vehicle 18 is arranged in such a way that the transport vehicle 18 which is received in a guide rail 16 can be positioned under a load 12 which is deposited, at least partly, on the surface 24 of the cargo hold floor 14. In other words, when the carrier face 22 is located in its first operating position, said carrier face 22 of the transport vehicle 18 does not protrude from the guide rail 16 but, on the contrary, is arranged in such a way that it is located below the surface 24 of the cargo hold floor 14 surrounding said guide rail 16.

In its second operating position, on the other hand, the carrier face 22 of each transport vehicle 18 is arranged in such a way that it lifts the load 12 off the surface 24 of the cargo hold floor 14 and carries it. In its second operating position, the carrier face 22 of the transport vehicle 18 consequently protrudes from the guide rail 16 and is thus shifted into the position for interacting with an underside of a load 12 which is deposited on the surface 24 of the cargo hold floor 14, and for thus lifting said load 12 off the surface 24 of the cargo hold floor 14. This makes it possible for the load 12 to be guided with the transport vehicle 18 when the latter moves along the guide rail 16, and to thus be likewise moved along said guide rail 16.

When the carrier face 22 is located in its third operating position, on the other hand, said carrier face 22 is arranged in one plane with the surface 24 of the cargo hold floor 14. A load 12 can then be brought into a position above the transport vehicle 18 which is received in a guide rail 16, and then be deposited, partly on the surface 24 of the cargo hold floor 14 and partly on the carrier face 22 of a transport vehicle 18 or a number of transport vehicles 18.

As likewise becomes clear from FIGS. 7 and 8, each transport vehicle 18 comprises a base section 26 and also a carrier section 28. Said carrier section 28 comprises the carrier face 22 and also a region of the transport vehicle 18 bordering on said carrier face 22, and is movable, relative to the base section 26, perpendicularly to the surface 24 of the cargo hold floor 14 in order to move the carrier face 22 between its first and its second operating position. That region of the transport vehicle 18 which is associated with the carrier section 28 and borders on the carrier face 22 is so dimensioned that it is capable of carrying the loads 12 which are to be transported by means of the transport vehicle 18.

As becomes clear from FIGS. 1, 2a and 2b, the guide rails 16 constructed in the cargo hold floor 14 are arranged at a distance from one another which is adapted or configured to the dimensions of the loads 12 to be transported. In particular, the distance between mutually adjacent guide rails 16 is so dimensioned that a load can be deposited on the carrier faces 22 of two transport vehicles 18 which are received in two mutually adjacent guide rails 16. As a result, the weight of the load 12 can be distributed over two transport vehicles 18, so that the strength and thereby the weight of the transport vehicles 18 does not need to be too high, and said transport vehicles 18 are easy to handle.

Figure 10:
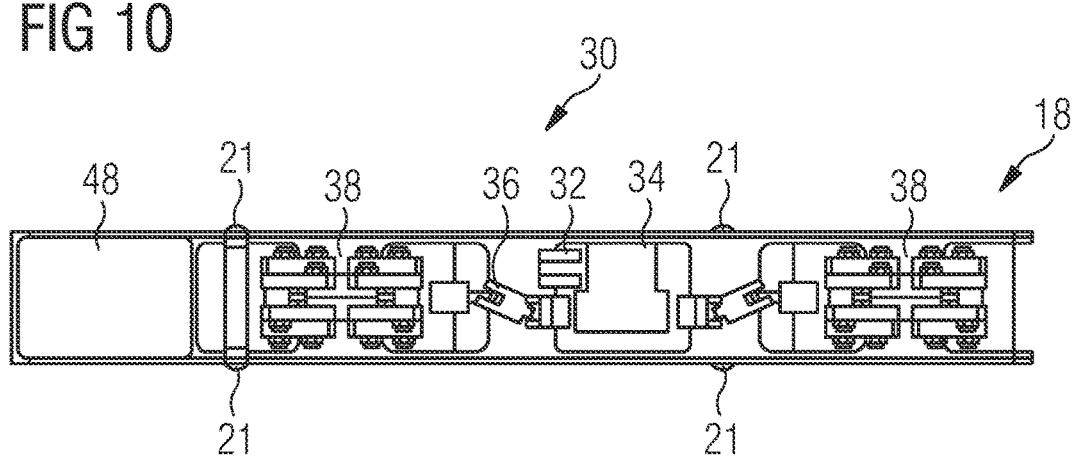
FIG. 10 shows a partly cut-away bottom view of the transport vehicle according to FIG. 4.

A lifting mechanism 30 for moving the carrier section 28 perpendicularly to the surface 24 of the cargo hold floor 14, and consequently the carrier face 22 between its first operating position and its second operating position, is illustrated in FIG. 10 and comprises a motor 32 constructed in the form of an electric motor, a transmission 34, a cardan joint 36 and a scissor lift table 38. The motor 32 is supplied with power by a battery.

Each transport vehicle 18 also comprises a first and a second stop element 40, 42, which stop elements extend upwards from the carrier face 22, at least in certain operating states of the transport vehicle 18, towards a load 12 which is carried by the carrier face 22 of said transport vehicle 18; see particularly FIGS. 7 and 8. The stop elements are each designed in the form of a stop pin and each interact with a side wall of a load 12 deposited on the carrier face 22, when said load 12 is moved along a guide rail 16 by means of the transport vehicle 18. The interaction of the stop elements 40, 42 with a corresponding side wall of a load 12 which is carried by the carrier face 22 of the transport vehicle 18 ensures that said load 12 is entrained in the desired manner when said transport vehicle 18 is moved along the guide rail. The stop elements 40, 42 are consequently arranged at a distance from one another which is adapted or configured to the dimensions of the loads 12 which are to be transported on the carrier face 22 of the transport vehicle 18.

Figure 5:
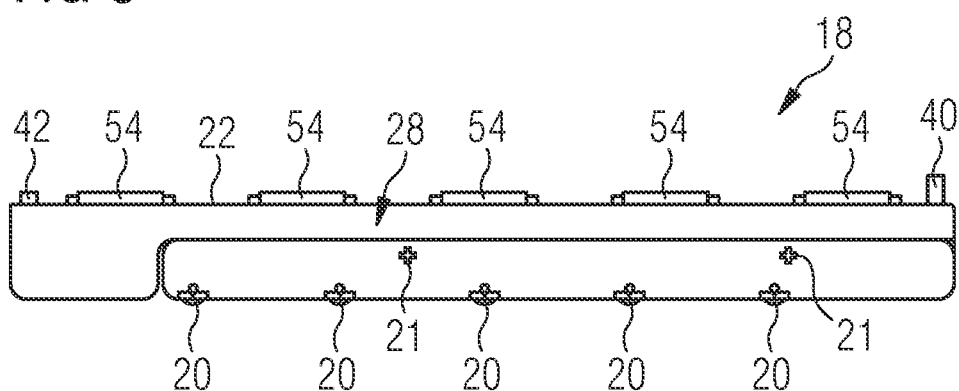
FIG. 5 shows a side view of the transport vehicle according to FIG. 4.

Whereas the first stop element 40 is designed as a rigid element, the second stop element 42 can be moved, relative to the carrier face 22 of the transport vehicle 18, between a transporting operating position, in which said second stop element 42 extends (see FIG. 8) from the carrier face 22 towards a load 12 which is carried by said carrier face 22 of the transport vehicle 18, and an inoperative position in which said second stop element 42 is retracted into said transport vehicle 18 (see FIGS. 5 and 7). In its inoperative position, the second stop element 42 consequently no longer protrudes upwards from the carrier face 22 of the transport vehicle 18, so that, after the lowering of the carrier face 22 out of its second operating position and into its first operating position, and the lowering, which is associated therewith, of a load 12 carried by said carrier face 22 onto the surface 24 of the cargo hold floor 14, the transport vehicle 18 can be moved along the guide rail 16, relative to the load 12, that is to say, out from under said load 12.

The second stop element 42 can be moved, by means of a drive mechanism 44, between its transporting operating position and its inoperative position, so that said second stop element 42 can be moved between its transporting operating position and its inoperative position even when the transport vehicle 18 is located in a position, for example, under a load 12, in which said second stop element 42 is not accessible for manual actuation. The drive mechanism 44 comprises a motor 46 which is constructed in the form of an electric motor and which is supplied with power by a battery.

Each transport vehicle 18 also comprises a control unit 48 which is set up for the purpose of controlling the movement of the carrier face 22 of the transport vehicle 18 between its first operating position and its second operating position, and also the movement of the second stop element 42 between its transporting operating position and its inoperative position; see FIG. 10. The batteries for supplying the motors 32, 46 with power are integrated into the control unit 48. The system 10 for moving loads 12 also comprises a remote control device 50 (see FIG. 1) which is set up for the purpose of sending control signals to a receiving apparatus 52 belonging to the control unit 50 of the transport vehicles 18; see FIGS. 4 and 7 to 9. Said remote control device is set up for the purpose of transmitting infrared signals. The receiving apparatus 52 is therefore designed in a corresponding manner in the form of an infrared receiving apparatus.

Finally, each transport vehicle 18 is provided, in the region of its carrier face 22, with a plurality of rollers 54 which are set up for the purpose of permitting movement of a load 12, parallel to the surface 24 of the cargo hold floor 14, into a position above the transport vehicle 18 received in a guide rail 16; see FIGS. 4, 5 and 7 to 9. When the carrier face 22 of the transport vehicle 18 is located in its first operating position, as shown in FIG. 3a, the rollers 54 arranged in the region of said carrier face 22 make it possible, in an almost frictionless manner, to bring a transport vehicle 18 which is received in a guide rail 16 into a position under a load 12 which is still resting on the surface 24 of the cargo hold floor 14. When the carrier face 22 of the transport vehicle 18 is located, as shown in FIG. 3b, in its second operating position, on the other hand, the load 12 which is then deposited on the carrier face 22 can be moved, relative to the transport vehicle 18, over the rollers 54 in a manner parallel to the surface 24 of the cargo hold floor 14. Finally, when the carrier face 22 of the transport vehicle 18 is located, as shown in FIG. 3c, in its third operating position, a load 12 can be brought, in an almost frictionless manner, into a position above the transport vehicle 18 which is received in a guide rail 16.

In that example of embodiment of a transport vehicle 18 which is shown in the drawings, the rollers 54 provided in the region of the carrier face 22 are constructed in the form of circular-cylindrical rollers whose axis of rotation extends parallel to the guide rail 16 when the transport vehicle 18 is received in said guide rail 16. Said rollers 54 are then distinguished by a high carrying capacity and high strength, but only permit movement of a load 12 parallel to the surface 24 of the cargo hold floor 14 and perpendicularly to the guide rail 16. If greater flexibility of movement of the loads 12, parallel to the surface 24 of the cargo hold floor 14, is desired, the transport vehicles 18 may also be provided with other rollers 54, for example rollers 54 of spherical construction.

In that example of embodiment of a system 10 for moving loads 12 which is shown in the drawings, the transport vehicles 18 are movable manually along the guide rails 16. In particular, each transport vehicle 18 may be moved along the guide rails 16 through the fact that a load 12 is positioned above said transport vehicle 18 in such a way that the stop elements 40, 42 come into engagement with corresponding side walls of the load 12, the carrier face 22 of the transport vehicle 18 is then brought into its second operating position and the load 12 is finally moved along the guide rail 16 together with said transport vehicle 18. As an alternative to this, however, it is also conceivably possible to equip the transport vehicles 18 with a suitable drive mechanism which allows automatic movement of said transport vehicles 18 along the guide rails 16.

As can be seen most clearly in FIG. 1, a plurality of roller tracks 56 which make it possible to move a load 12 about in a direction parallel to the surface 24 of the cargo hold floor 14 are integrated into a partial region of said cargo hold floor 14 which is arranged adjacent to a door 58 of the cargo hold 100. The roller tracks 56 each comprise a plurality of rollers which are so dimensioned that a load 12 which is deposited on the rollers of the roller tracks 56 is at a sufficient distance from the surface 24 of the cargo hold floor 14 to enable said load 12 to be moved about parallel to said surface 24 of the cargo hold floor 14 without friction. When the carrier face 22 of the transport vehicles 18 is located in its third operating position, the rollers 54 provided in the region of said carrier face 22 of the transport vehicles 18 preferably lie in one plane with the rollers of the roller tracks 56 which are integrated into the partial region of the cargo hold floor 14; see FIG. 3c. The integration of roller tracks 56 into a partial region of the cargo hold floor 14 close to the door makes it possible to ensure that the cargo hold 100 can be completely loaded, even if the transport vehicles 18 have to be taken out of the guide rails 16 towards the end of the loading operation before said guide rails 16 are covered by loads 12, or else said transport vehicles cannot yet be positioned in the guide rails 16 at the start of the unloading operation because said guide rails 16 are still covered by loads 12.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for moving loads comprising:
   a cargo hold floor comprising a plurality of guide rails; and
   a plurality of separate transport vehicles which are received in the guide rails in a removable manner and are movable along said guide rails and which each comprise a carrier face which is movable, perpendicularly to a surface of the cargo hold floor, between a first operating position and a second operating position, wherein the carrier face is arranged, in the first operating position, below the surface of the cargo hold floor such that each transport vehicle is contained entirely within a respective guide rail and, in the second operating position, said carrier face is arranged above the surface of the cargo hold floor, wherein the carrier face of the transport vehicles is movable, perpendicularly to the surface of the cargo hold floor, into a third operating position which lies between the first operating position and the second operating position, wherein the carrier face is kept in the third operating position such that the carrier face is arranged in one plane with the surface of the cargo hold floor, wherein the carrier face comprises a plurality of rollers, and wherein each transport vehicle comprises two side faces, disposed on laterally opposite sides of the transport vehicle, wherein each side face is provided with a plurality of lateral rollers which are adapted to interact, when the transport vehicle is moved along the guide rail, with a side face of said guide rail that lies opposite the side face of said transport vehicle.

2. The system for moving loads according to claim 1, wherein the rollers are constructed in the form of circular-cylindrical rollers, whose axis of rotation extends parallel to the guide rail.

3. The system for moving loads according to claim 1, wherein each transport vehicle comprises at least one stop element which extends from the carrier face towards a load carried by said carrier face of the transport vehicle, and is adapted to interact with a side wall of the load when said load is moved along the guide rail via the transport vehicle.

4. The system for moving loads according to claim 3, wherein the stop element is movable, relative to the carrier face of the transport vehicle, between a transporting operating position, in which said stop element extends from the carrier face towards a load carried by said carrier face of the transport vehicle, and an inoperative position in which said stop element is retracted into the transport vehicle.

5. The system for moving loads according to claim 4, wherein a drive mechanism for moving the stop element between the transporting operating position and the inoperative position comprises an electric motor.

6. The system for moving loads according to claim 1, wherein the transport vehicle has a base section and also a carrier section, wherein said carrier section comprises the carrier face and a region of the transport vehicle bordering on said carrier face, and is movable, relative to the base section, perpendicularly to the surface of the cargo hold floor.

7. The system for moving loads according to claim 1, wherein a lifting mechanism for moving the carrier face of the transport vehicle between the first operating position and the second operating position comprises at least one of a motor, a transmission, a Cardan joint and a scissor lift table.

8. The system for moving loads according to claim 4, wherein each transport vehicle also comprises a control unit which is adapted to control at least one of the movement of the carrier face of the transport vehicle between the first operating position and the second operating position and the movement of the stop element between the transporting operating position and the inoperative position.

9. The system for moving loads according to claim 1, further comprising a remote control device which is adapted to send control signals to a receiving apparatus belonging to a control unit of the transport vehicles.

10. The system for moving loads according to claim 1, wherein a plurality of roller tracks are integrated into a partial region of the cargo hold floor.

11. A cargo hold having a system for moving loads comprising:

a cargo hold floor comprising a plurality of guide rails; and a plurality of separate transport vehicles which are received in the guide rails in a removable manner and are movable along said guide rails and which each comprise a carrier face which is movable, perpendicularly to a surface of the cargo hold floor, between a first operating position and a second operating position, wherein the carrier face is arranged, in the first operating position, below the surface of the cargo hold floor a load over the transport vehicle is deposited on the surface of the cargo hold floor and such that each transport vehicle is contained entirely within a respective guide rail and, in the second operating position, said carrier face is arranged above the surface of the cargo hold floor such that the transport vehicle lifts the load off the surface of the cargo hold floor and carries the load, wherein the carrier face of the transport vehicles is movable, perpendicularly to the surface of the cargo hold floor, into a third operating position which lies between the first operating position and the second operating position, wherein the carrier face is kept in the third operating position such that the carrier face is arranged in one plane with the surface of the cargo hold floor, wherein the carrier face comprises a plurality of rollers which are adapted to permit movement of the load parallel to the surface of the cargo hold floor, wherein each transport vehicle comprises two side faces, disposed on laterally opposite sides of the transport vehicle, wherein each side face is provided with a plurality of lateral rollers which are adapted to interact, when the transport vehicle is moved along the guide rail, with a side face of said guide rail that lies opposite the side face of said transport vehicle.

12. The cargo hold according to claim 11, wherein the partial region of the cargo hold floor into which a plurality of roller tracks are integrated is arranged adjacent to a door of the cargo hold.

13. An aircraft comprising cargo hold having a system for moving loads comprising:

a cargo hold floor in which a plurality of guide rails are recessed; and a plurality of separate transport vehicles which are received in the guide rails in a removable manner and are movable along said guide rails and which each comprise a carrier face which is movable, perpendicularly to a surface of the cargo hold floor, between a first operating position and a second operating position, wherein the carrier face, in the first operating position, does not protrude from a guide rail in which the transport vehicle is received, such that a load over the transport vehicle is deposited on the surface of the cargo hold floor and such that each transport vehicle is contained entirely within a respective guide rail and, in the second operating position, said carrier face protrudes from the guide rail such that the transport vehicle lifts the load off the surface of the cargo hold floor and carries the load, wherein the carrier face of the transport vehicles is movable, perpendicularly to the surface of the cargo hold floor, into a third operating position which lies between the first operating position and the second operating position, wherein the carrier face is kept in the third operating position such that the carrier face is arranged in one plane with the surface of the cargo hold floor, and wherein the carrier face comprises a plurality of rollers which are adapted to permit movement of the load parallel to the surface of the cargo hold floor, and wherein each transport vehicle comprises two side faces, disposed on laterally opposite sides of the transport vehicle, wherein each side face is provided with a plurality of lateral rollers which are adapted to interact, when the transport vehicle is moved along the guide rail, with a side face of said guide rail that lies opposite the side face of said transport vehicle.

\* \* \* \* \*